US005466294A

United States Patent [19]

Kearney et al.

[11] Patent Number: 5,466,294

[45] Date of Patent: Nov. 14, 1995

[54] SUGAR BEET JUICE PURIFICATION PROCESS

[75] Inventors: Michael M. Kearney; Vadim Kochergin; Kenneth R. Peterson; Larry Velasquez, all of Twin Falls, Id.

[73] Assignee: The Amalgamated Sugar Company, Ogden, Utah

[21] Appl. No.: 168,065

[22] Filed: Dec. 14, 1993

[51] Int. Cl.[6] ................................ C13J 1/06; C13F 1/02; B01D 15/00

[52] U.S. Cl. ............................ 127/42; 127/46.2; 127/58; 210/656; 210/660; 210/687

[58] Field of Search .............................. 127/42, 46.2, 58, 127/61; 210/656, 660, 687

[56] References Cited

U.S. PATENT DOCUMENTS

| | | | |
|---|---|---|---|
| 2,413,844 | 1/1947 | Rawlings | 127/46.2 |
| 3,618,589 | 11/1971 | Tavani | 127/46 A |
| 3,785,863 | 1/1974 | Devillers et al. | 127/9 |
| 3,975,205 | 8/1976 | Munir et al. | 127/46 A |
| 4,140,541 | 2/1979 | Popper | 127/46 A |
| 4,331,483 | 5/1982 | Mirabel et al. | 127/46.2 |
| 5,176,832 | 1/1993 | Dorta et al. | 127/46.3 |

*Primary Examiner*—Paul Lieberman
*Assistant Examiner*—Patricia Hailey
*Attorney, Agent, or Firm*—Trask, Britt & Rossa

[57] ABSTRACT

A process for purifying the raw juice (diffusion juice) obtained from sugar beets replaces the traditional liming and carbonation purification methods with ion exchange softening and chromatographic separation operations.

30 Claims, 1 Drawing Sheet

SUGAR BEET JUICE PURIFICATION PROCESS

BACKGROUND OF THE INVENTION

1. Field

This invention is directed to the process of purifying raw juice extracted from sugar beets prior to crystallization of the sucrose contained in the juice.

2. State of the Art

In the conventional production of crystallized sucrose (sugar) from sugar beets, a "raw juice" is initially obtained by diffusion of soluble material from the beets. The raw juice is then partially purified. The purpose of this initial purification step is to remove a significant portion of the "nonsucrose" fraction from the juice. The partially purified juice exhibits improved subsequent processing, yields a higher recovery of crystallized product and improves product quality with respect to color, odor, taste and solution turbidity.

The most commonly used method for raw beet juice purification is ubiquitous, and is based upon the addition of lime and carbon dioxide. The initial steps of this method occur prior to crystallization, during a phase commonly referred to as the "beet end" of the process. The sugar beets are typically diffused with hot water to extract a "raw juice" or "diffusion juice". The raw juice contains (1) sucrose (2) nonsucroses and (3) water. The term "nonsucroses" includes all of the sugar beet derived substances, including both dissolved and undissolved solids, other than sucrose, in the juice. Other constituents which may be present in the raw juice are not of concern to the present invention.

The raw juice is heated to high temperature, and a solution/suspension of calcium oxide and water (milk of lime) is added to the juice. The juice is then treated with carbon dioxide gas to precipitate the calcium oxide as calcium carbonate. This step is commonly called "first carbonation" and it is the foundation of the conventional purification scheme, resulting in a "first carbonation juice." During this step, various nonsucrose compounds, color etc. are removed or transformed by reaction with the lime or by absorption by the calcium carbonate precipitate.

Conventionally, the calcium oxide and the carbon dioxide are produced by heating limerock (calcium carbonate) in a high temperature kiln. The calcium carbonate decomposes to calcium oxide and carbon dioxide, which are then recombined in the first carbonation step. The resulting calcium carbonate "mud" is usually removed from the first carbonation juice by settling clarifiers or by appropriate falters. The resulting "lime waste" is difficult to dispose of and contains about 20–30 percent of the original raw juice non sucrose. The first carbonation juice is most commonly sent to a second carbon dioxide gassing tank (without lime addition). This gassing step is often referred to as "second carbonation." The purpose of the second carbonation step is to reduce the level of calcium present in the treated ("second carbonation") juice by precipitating the calcium ions as insoluble calcium carbonate. The calcium precipitates, often called "limesalts," can form a noxious scale in downstream equipment, such as evaporators. The second carbonation juice is usually filtered to remove the precipitated calcium carbonate.

Following these purification steps, the remaining juice is referred to as "thin juice". Only about 20–30 percent of the nonsucroses in the raw juice are susceptible to removal by liming and carbonation treatments. The remaining nonsucroses ("non-removable nonsucroses") have chemical characteristics which make it impossible to remove them through those expedients. These constituents remain in the thin juice.

The thin juice, which may range typically from about 10 to about 16 percent solids, based upon the weight of the juice, is sent to a concentration step to raise the solids content to about 60 to about 70 percent by weight. There results a purified syrup, which is referred to as "thick juice."

A number of variations to the liming and carbonation process are in use in the industry. Typical alterations to the basic process described include:

"Preliming," which is conducted prior to first carbonation. This procedure involves the progressive controlled addition of lime, whereby certain nonsucroses are precipitated and stabilized for subsequent removal.

"Main liming," which is also conducted prior to first carbonation, and involves the addition of lime to the juice at conditions of high pH and high temperature, whereby to destroy certain nonsucroses and to produce a more thermostable juice.

"Defeco-carbonation," which involves the simultaneous addition of lime and carbon dioxide on a continuous basis.

"Adjustable processes," wherein the amount of lime, the temperature, and the addition of other chemicals, such as sulfur dioxide or soda ash, are incorporated into the liming and carbonation process to make the process more adaptable to changing conditions.

During the crystallization process, the purified thick juice produced on the beet end is sent to the "sugar end." The function of the sugar end of the process is to crystallize the sucrose from the thick juice as a marketable product. This product is most commonly referred to as "sugar" by consumers or others outside the industry. It is not feasible to crystallize all of the sucrose in the thick juice as acceptable product. A large amount of this sucrose is lost to a discard called "molasses". This inefficiency is largely due to the reality that the liming and carbonation "purification" procedures actually remove only a minor portion of the nonsucrose in the juice. The presence of residual nonsucrose in the thick juice significantly interferes with the efficient crystallization and recovery of the sucrose because of inherent crystallization and solubility effects. Consequently, a low value molasses is an unavoidable byproduct of the crystallization procedure.

The molasses recovered from the crystallizers contains substantially all the nonsucrose components originally in the thick juice, together with a significant portion, typically on the order of about 15 percent, of the original thick juice sucrose content. The molasses thus represents the major loss of sucrose in a beet factory. It is usually discarded as an animal feed. Occasionally, specialized processes are employed to recover additional sucrose from this byproduct.

The typical beet sugar crystallization process consists of three crystallization procedures operated in series. These crystallization steps are often referred to as "A," "B" and "C" crystallizations, respectively; where "A" corresponds to "white;" "B" corresponds to "high raw" and "C" corresponds to "low raw" crystallizations, respectively, according to an alternative terminology.

Each subsequent crystallization step receives the mother liquor from the preceding step. The mother liquor from the last crystallization step is discarded from the process as molasses. Each crystallization step removes sucrose. Accordingly, the mother liquor increases in nonsucrose concentration with each succeeding step. The decreasing purity of the mother liquors interferes progressively with the rate of crystallization and the quality of the crystallized product from the B and C steps. The crystallization rate is typically an order of magnitude lower during the C crystallization step than during the A crystallization step. Crystallized product from the B and C steps is generally of such poor quality that it is recycled to the A crystallization step. Generally, only sucrose crystallized in the A step is considered to be of marketable quality.

Methods have been proposed for the production of marketable sucrose that avoid liming and carbonation purification procedures. These proposals have not been adopted because of their significant shortcomings.

Raw juice crystallization without purification has been proposed. However, the sucrose crystallized directly from raw juice exhibits very high color, off-odor, off-taste and high suspended solids content. Significant evaporator scaling occurs. Recovery of product sucrose is also extremely poor because the mother liquor produced by crystallizing unpurified raw juice inevitably carries even more sucrose to the molasses byproduct.

Ion exchange purification of process juices has been proposed. Such a method depends upon exchanging juice nonsucroses for less noxious materials. Because very large mounts of the exchangeable nonsucroses are present in raw juice, at least equal amounts of less noxious nonsucroses must be provided for the exchange. Consequently, these methods have been considered generally impractical because of the very large mounts of expensive regenerants and regenerant waste produced. In addition, lime-removable nonsucroses are more cheaply removed with lime than with ion exchange. Various methods and equipment used for purifying raw sugar juice by ion exchange are disclosed in British Patent No. 1,043,102, U.S. Pat. Nos. 3,618,589, 3,785,863, 4,140,541 and 4,331,483.

Membrane filtration has been proposed, and methods have been tested involving the use of membranes to separate materials of differing molecular weight from the raw juice. Such methods necessitate a high capital cost, have a short membrane lifetime with expensive replacement cost and significant loss of sugar to the "concentrate" membrane byproduct stream. The resulting juice is not of a higher purity than that realized with conventional liming and carbonation. Suggestions have been made to combine the membrane purification with liming and carbonation, electrodialysis or ion exchange demineralization. A proposed method of purification of raw sugar juice involving membrane ultrafiltration is disclosed in U.S. Pat. No. 4,432,806.

Chromatography has been proposed, and is presently used in a few locations, as a method of separation applied to the byproduct molasses. The purpose of molasses chromatography is to recover residual sucrose from this byproduct stream. The resulting chromatographic product is of relatively poor quality due to high color, odor and low purity. It is generally mixed with conventionally produced syrups to lessen its detrimental effects upon crystallization. The product is sometimes cleaned-up first with ion-exchange or it is returned to the beet end for a second pass through the liming and carbonation purification process.

Because the molasses chromatographic separator is designed to operate on the final byproduct stream of the sugar factory, it has no beneficial impact on the upstream purification or crystallization processes. Its purpose is to act as a last step to recover the sucrose lost in the molasses. It is designed to operate on material derived from the conventional liming and carbonation process.

A method and apparatus for chromatographic molasses separation are disclosed in U.S. Pat. No. 4,312,678. Other methods and apparatus using simulated moving bed chromatographic separators are disclosed in U.S. Pat. Nos. 2,985,589, 4,182,633, 4,412,866 and 5,102,553.

SUMMARY OF THE INVENTION

The beet juice purification process of the present invention is a fundamental departure from the conventional purification process and its variants. It improves upon the conventional process for purification of raw juice with respect to environmental concerns, sucrose recovery and quality, material handling factors and process complexity.

The process typically incorporates the conventional diffusion of raw juice from the sugar beets. It may also incorporate conventional crystallization procedures. In place of the conventional first and second carbonation steps, however, the purified raw juice is subjected to a novel softening procedure followed by a novel chromatographic separation procedure. Both of these procedures may be conducted in equipment which has found application for different purposes in the sugar recovery industry.

Generally stated, this invention provides an improved process for purifying the raw juice obtained from sugar beets. The process involves subjecting the raw juice to a softening procedure, whereby to produce a soft raw juice from which more than half of the nonsucrose constituents can be removed; concentrating the soft raw juice to produce a soft raw syrup and then subjecting the soft raw syrup to a chromatographic separation procedure, whereby to obtain a raw syrup extract from which at least half, preferably more than about 70 percent of the original nonsucrose in the starting raw juice has been removed. Preferably, the raw juice is processed to reduce its suspended solids content to a level of less than about a tenth of a volume percent before the raw juice is subjected to the ion exchange softening procedure. The raw juice is subjected to the softening procedure until the calcium level in the soft raw juice is reduced to less than about 5, ideally less than about 3, milliequivalents per 100 grams of dry substance. The soft raw juice is concentrated to above about 50 weight percent dissolved solids to produce the soft raw syrup. For storage, the soft raw juice may be concentrated sufficiently to produce a soft raw syrup containing above about 65 weight percent solids. The soft raw syrup is then stored at a temperature sufficient to prevent crystallization of sucrose. The chromatographic separation procedure may utilize an ion exchange resin as a chromatographic medium. It is ideally based upon a low cross-linked gel type chromatographic separation resin in monovalent form.

In its more preferred embodiments, the process may further include providing means for monitoring calcium level in the soft raw juice, and discontinuing flow to the ion exchange softening procedure when the monitoring means reveals a calcium ion concentration above a predetermined set point. The duration that the raw juice is subjected to the ion exchange softening procedure is ordinarily determined by the calcium composition of the sugar beets processed to form the raw juice. The juice is typically subjected to the softening procedure until the calcium level in the soft raw juice is reduced to less than about 3 milliequivalents per 100 grams of dry substance. The raw juice is typically processed to reduce its suspended solids content to a level of less than about 0.05 volume percent before the raw juice is subjected to the ion exchange softening procedure. The soft raw juice is preferably concentrated to between about 50 and about 70 weight percent dissolved solids to produce the soft raw syrup.

Residual suspended solids in the raw juice are preferably first reduced to a low level, using routine separation methods, such as filtration or centrifugation. The present invention is preferably applied to raw juice with a suspended solids level of less than about 0.05 volume percent. Higher levels of suspended solids tend to cause plugging of subsequent resin-based equipment with insoluble beet material, thereby requiring more frequent backwashing of such equipment.

The raw juice is then passed through an ion exchange softener to remove calcium ions. This ion exchange step differs conceptually from previously known ion exchange purification processes wherein large percentages of nonsucroses are exchanged. According to this invention, only the relatively small mount of calcium ion present in the raw juice is removed.

Excess calcium in the raw juice can cause downstream evaporator scaling and poor heat transfer characteristics. Calcium can also interfere with sucrose separation in the downstream chromatographic separator contemplated by this invention. Coagulation reactions which can occur when the pH of the raw juice is altered or when it is evaporated to increase solids content are eliminated by "softening" (the removal of calcium ion). The raw juice is stabilized in this respect by an ion exchange or comparable softening step. The resulting treated juice is identified as "soft raw juice".

The ion exchange resin utilized for softening can be of either strong cation or weak cation design. Variations of both types are conventionally found in the sugar industry for softening of conventionally limed and carbonated juices or their subsequent syrups. The flowrates, temperatures, regenerants and equipment conventionally used to soften limed and carbonated "thin juice" will produce satisfactory results for the practice of this invention.

The softening requirements of this invention are relatively more strict than those observed for the conventional softening of "thin juice." According to this invention, softening should reduce calcium ion concentration sufficiently to prevent calcium fouling of a chromatographic separator. The calcium level in the soft raw juice should thus preferably be below about 3 milliequivalents per 100 grams of dry substance. At higher levels, the chromatographic separator operation tends progressively to drift to unacceptable results, eventually requiring chemical regeneration. By maintaining the recommended low calcium level, regeneration of the chromatographic separator can ordinarily be avoided.

The soft raw juice is concentrated, typically by evaporation, to a percent solids level appropriate for use as a feed for a subsequent chromatographic separation step. Concentration to a solids content of about 50 to about 70 percent by weight is generally appropriate for a satisfactory raw syrup chromatographic separation. The concentrated material is identified as "soft raw syrup". Together with water, the soft raw syrup is passed through a monovalent form chromatographic separator to remove high levels of nonsucrose, thereby resulting in a highly purified sucrose syrup appropriate for subsequent crystallization, identified as "raw syrup extract". A byproduct, "raw syrup raffinate," is obtained from the chromatographic separator, and contains the majority of the nonsucroses. It is suitable as an animal feed or chemical feedstock.

The following parameters are generally suitable for use in the practice of this invention: The separator may be charged with a low cross-linked gel type chromatographic separation resin in monovalent form (sodium/potassium). Examples of suitable resins include Dowex 99 monosphere resin and Bayer Lewatit MDS 1368 resin. The dissolved solids content of the feed syrup may generally be within the range of about 50 to about 70 weight percent. The feed syrup should ideally contain less than about 3 milliequivalents calcium ion per 100 grams dry substance. Feed water can be any of softened water, de-ionized water or condensate. In any case, the water should be free of hardness.

Water feed to syrup feed ratios are preferably held to within the range of about 2.0 to about 5.0, with the highest ratios corresponding to the syrups having the highest percent solids. Higher ratios can be used, but will cause unnecessary dilution of the product raw syrup extract and raw syrup raffinate. Solids loading of the chromatographic separator should typically be held to less than about 120 pounds dry substance per cubic foot of resin per day to avoid overloading the separation resin with sucrose. Operating temperature should be above 75° C. to prevent microbiological growth within the chromatographic system.

The raw syrup extract obtained from the separator may be sent to a conventional downstream crystallization process. However, ion exchange purification may be applied to the raw syrup extract as a substitute and/or enhancer for crystallization. Previous attempts to purify raw juice with ion exchange techniques have not proven satisfactory in the past because of the large amount of chemical regenerants and waste involved. Because the raw syrup extract of the present invention is highly purified, a much more practical and smaller ion exchange system can be used for a final clean-up of raw juice extract to yield a pure liquid sugar or enhanced crystallization feed.

In comparison with the conventional production methods and apparatus, the benefits of the present invention cover nearly all areas of interest to a processor. Included among these benefits are significant gains in sucrose recovery, reduced chemical use, significant reduction in pollution concerns, significantly higher quality product, reduced labor requirements, improved safety and overall simplification of the process.

Typical advantages offered by various embodiments of the present invention over conventional systems include:

a) The entire liming and carbonation system of the conventional system is eliminated, thereby avoiding the costs, hazards and environmental impacts inherent in that system.

b) The nonsucroses ordinarily lost to waste lime are recovered as an edible animal feed or for use as a chemical feedstock, rather than being disposed of with the lime waste.

c) The heavy use of chemicals for purification in the conventional liming and carbonation process is replaced primarily by the use of water which drives the chromatographic separation in the present invention.

d) A much higher level of juice purification is achievable. Typically, about 70 to about 80 percent of the nonsucrose is eliminated by the present invention.

e) Sucrose recovery is increased, typical by about 10 percent.

f) The quantity of material which must be processed, and thus the equipment required, during the crystallization steps is significantly decreased. The nonsucrose load and the internal recycle loads are reduced for an equivalent production. In a typical embodiment, material processed in the "A" crystallization is reduced by about 33 percent, material processed in the "B" crystallization is reduced by about 75 percent and the final "C" stage requirements are reduced by about 80 percent.

g) Molasses production is reduced by about 80 percent.

h) It is easier to maintain a low odor in the product.

i) More than 80 percent of the sodium and potassium salts in the raw juice are removed, thereby decreasing sucrose losses, and avoiding a major cause of off-taste concerns.

BRIEF DESCRIPTION OF THE DRAWINGS

In the drawing, which illustrates what is presently regarded as the best mode for carrying out the invention:

The sole FIGURE is a flow diagram showing the process of the invention.

DETAILED DESCRIPTION OF THE ILLUSTRATED EMBODIMENT

Figure 1:
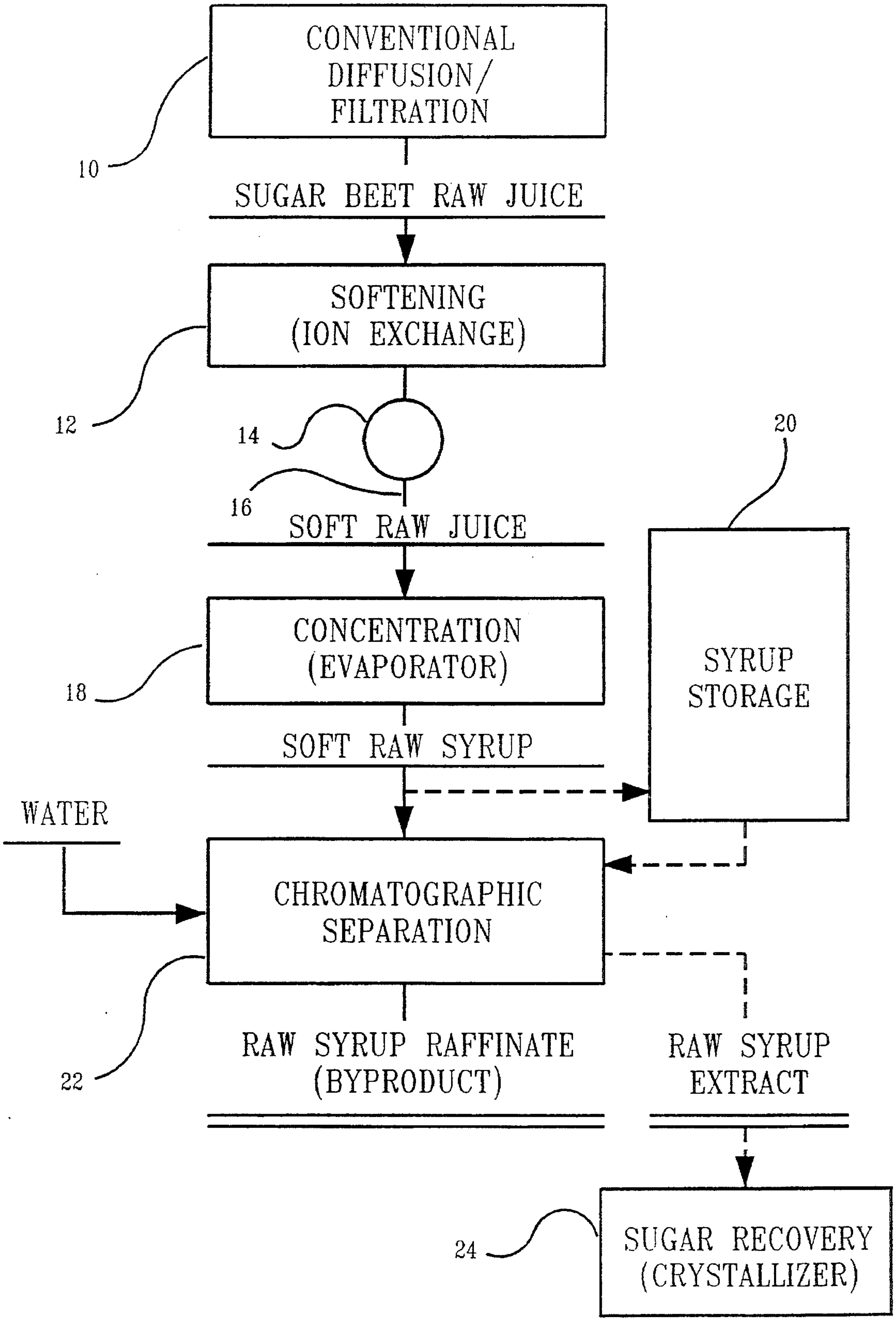

As illustrated, a sugar beet raw juice feed stock is prepared in conventional fashion by diffusion and filtration procedures 10. It is then fed to an ion exchange softening column 12. A typical feed to the softening column 12 will contain about 10 to about 16 percent dissolved solids, by weight. Residual suspended solids in the raw juice will typically have been reduced to a low level, e.g. 0.05 volume percent, by filters, centrifuges or other conventional equipment.

Resin in the column 12 removes calcium ion, which is naturally present in the raw juice. Without regard to the condition of the beets at the time of processing, no lime need be added to raw juice processed in accordance with this invention. Accordingly, softener cycle times will be dependent only upon the calcium composition of the sugar beets at the time of harvest. The cycle times are thus consistent throughout the processing campaign.

In the illustrated instance, an on-line hardness monitor 14 is provided just downstream of the column 12. This monitor 14 facilitates automatic exhaustion cycle termination when the calcium level in the soft raw juice exhaust stream 15 reaches a predetermined set point, e.g. 3 milliequivalents per 100 grams dissolved solids (DS). This procedure reduces end of cycle calcium leakage.

Following softening, the soft raw juice is concentrated in evaporator 18 to produce a soft raw syrup. The soft raw syrup may optionally be stored in a storage tank 20 for a period of time before subsequent processing. For storage, the soft raw syrup is ideally concentrated to a solids level sufficiently high to prevent microbiological contamination but below the level which would cause significant amounts of sucrose to crystallize out of the syrup. A concentration of approximately 67 percent by weight solids is appropriate for a storage temperature above about 25° C. In any event, the soft raw syrup will ordinarily be concentrated to above about 50 weight percent dissolved solids.

The soft raw syrup is eventually fed to a strong cation based chromatographic separator 22. The by-product (raw syrup raffinate) obtained from the separator 22 contains the majority of the nonsucrose. These nonsucrose constituents comprise the salts, amino acids, raffinose, colored materials, etc. which were originally present in the sugar beets. The raw syrup raffinate is suitable for use as an animal feed or as a chemical feedstock. For storage purposes, the raw syrup raffinate should ordinarily be concentrated to at least about 65 weight percent dissolved solids to prevent microbiological contamination.

A raw syrup extract is obtained from the separator 22 as an intermediate recovered product of this invention. This product may be forwarded to a sugar recovery operation 24 of any convenient type. The raw syrup extract produced by this invention may be processed by a conventional crystallization procedure, for example.

The following examples are illustrative of the present invention:

EXAMPLE I

Raw juice was obtained from a standard sugar beet diffusion process. Before softening, the juice was filtered to remove residual suspended solids. The raw juice was then passed through a weak cation, x ion exchange softener operated in potassium form. The softener resin was Dowex MWC-1 weak cation. The softener was operated upflow at 30 resin bed volumes of raw juice per hour and through a bed depth of 40 inches of resin. Operating temperature was 80° C. The softener exhaustion was terminated when the exiting juice exhibited a composited calcium ion level over 3 milliequivalents/100 grams dissolved solids.

The softened raw juice was concentrated through a rising film evaporator to produce a soft raw syrup containing 67 percent dissolved solids. Specific characteristics of the syrup were as follows:

Purity (weight percent sucrose, based upon total dissolved solids)=88.62

Conductivity (millisiemens)=6.61

Invert level (glucose+fructose)=0.344 grams/100 grams solids

Raffinose level=0.312 grams/100 grams solids

Betaine level=1.2 grams/100 grams solids

Calcium level=0.0003 grams/100 grams solids

Potassium level=3.07 grams/100 grams solids

Sodium level=0.0047 grams/100 grams solids

The soft raw syrup was next fed to a chromatographic separator operating at the following parameters:

Resin type=Bayer Lewatit MDS 1368, gel chromatographic resin, monovalent form

Separator loading=35 lbs. solids fed per cubic ft. resin per day

Feed percent solids=diluted to constant 60 percent

Ratio water fed to syrup fed=3.0

Operating temperature=80° C.

Operation=simulated moving bed

Number of cells=8

Resin depth=9 feet

The following results were obtained:

| | Raw syrup extract | Raw syrup raffinate |
|---|---|---|
| Purity | 97.4 | 9.7 |
| Conductivity (millisiemens) | .56 | 14.84 |
| Invert grams/100 DS | .23 | 1.1 |
| Raffinose grams/100 DS* | .29 | .79 |
| Betaine grams/100 DS | .92 | 2.8 |
| Potassium grams/100 DS | 0.11 | 20.6 |
| Sodium grams/100 DS | 0.01 | 1.8 |

*100 grams dissolved solids

By contrast, conventional liming and carbonation procedures applied to the same filtered raw juice would be expected to raise the raw juice purity to about 91.2 (corresponding to 25 percent nonsucrose elimination).

EXAMPLE II

A second portion of the same filtered raw juice described by EXAMPLE I was passed through a strong cation softener in sodium form. A primary and secondary ion exchange cell were used to insure proper softening with the less efficient strong cation system. In this case, the resin used was Dowex CM16. The softener was operated downflow at 20 resin bed volumes of raw juice per hour and through a bed depth of 40 inches of resin. Operating temperature was 80° C. The remaining steps of EXAMPLE I were applied to the resulting softened raw juice. A purity in excess of 97 percent was obtained for the resulting raw syrup extract.

What is claimed is:

1. A process for purifying the raw juice obtained from sugar beets, comprising:

subjecting said raw juice to a softening procedure to remove calcium equivalents, whereby to produce a soft raw juice;

concentrating said soft raw juice by the removal of water to produce a soft raw syrup; and subjecting said soft raw syrup to a chromatographic separation procedure, whereby to obtain a raw syrup extract containing less than about half of the nonsucrose dissolved solids constituents contained by said raw juice.

2. A process according to claim 1, wherein said softening procedure comprises an ion exchange operation utilizing a cation exchange resin in monovalent form.

3. A process according to claim 2, wherein said raw juice is processed to reduce its suspended solids content to a level of less than about one tenth volume percent before said raw juice is subjected to said ion exchange softening procedure.

4. A process according to claim 3, wherein said raw juice is subjected to said softening procedure until the calcium level in said soft raw juice is reduced to less than about 5 milliequivalents per 100 grams of dry substance.

5. A process according to claim 4, wherein said soft raw juice is concentrated to above about 50 weight percent dissolved solids to produce said soft raw syrup.

6. A process according to claim 5, wherein said soft raw juice is concentrated to produce a soft raw syrup containing above about 65 weight percent solids, and said soft raw syrup is stored at a temperature sufficient to prevent crystallization of sucrose.

7. A process according to claim 5, wherein said chromatographic separation procedure is based upon a low cross-linked gel type chromatographic separation resin in monovalent form.

8. A process according to claim 1, further including providing means for monitoring calcium level in said soft raw juice and discontinuing flow to said ion exchange softening procedure when said means reveals a calcium ion concentration above a set point.

9. A process according to claim 1, wherein the duration that said raw juice is subjected to said ion exchange softening procedure is determined by the calcium composition at the time of harvest of the sugar beets processed to form said raw juice.

10. A process according to claim 1, wherein said juice is subjected to said softening procedure until the calcium level in said soft raw juice is reduced to less than about 3 milliequivalents per 100 grams of dry substance.

11. A process according to claim 10, wherein said raw juice is processed to reduce its suspended solids content to a level of less than about 0.05 volume percent before said raw juice is subjected to said ion exchange softening procedure.

12. A process according to claim 11, wherein said soft raw juice is concentrated to above about 50 weight percent dissolved solids to produce said soft raw syrup.

13. A process according to claim 11, wherein said soft raw juice is concentrated to between about 50 and about 70 weight percent dissolved solids to produce said soft raw syrup.

14. A process according to claim 13, wherein said chromatographic separation procedure is based upon a low cross-linked gel type chromatographic separation resin in monovalent form.

15. A process according to claim 1, wherein:

said juice is subjected to said softening procedure until the calcium level in said soft raw juice is reduced from a higher level to less than about 5 milliequivalents per 100 grams of dry substance;

said soft raw juice is concentrated to produce a soft raw syrup containing above about 50 weight percent dissolved solids; and said soft raw syrup is subjected to said chromatographic separation procedure to obtain a raw syrup extract from which more than about seventy weight percent of the original nonsucrose dissolved solids constituents contained by said raw juice has been removed.

16. A process for producing a raw syrup extract from sugar beets, comprising:

processing said sugar beets to obtain a raw juice which contains nonsucrose dissolved solids constituents;

subjecting said raw juice while it still contains said nonsucrose dissolved constituents to a softening procedure to remove calcium equivalents, whereby to produce a soft raw juice;

concentrating said soft raw juice to produce a soft raw syrup; and subjecting said soft raw syrup to a chromatographic separation procedure, whereby to obtain a said raw syrup extract containing less than about half of the nonsucrose dissolved solids constituents contained by said raw juice.

17. A process according to claim 16, wherein said softening procedure comprises an ion exchange operation utilizing a cation exchange resin in monovalent form.

18. A process according to claim 17, wherein said raw juice is processed to reduce its suspended solids content to a level of less than about one tenth volume percent before said raw juice is subjected to said ion exchange softening procedure.

19. A process according to claim 18, wherein said raw juice is subjected to said softening procedure until the hardness level in said soft raw juice is reduced to less than about 5 milliequivalents calcium per 100 grams of dry substance.

20. A process according to claim 19, wherein said soft raw juice is concentrated to above about 50 weight percent dissolved solids to produce said soft raw syrup.

21. A process according to claim 20, wherein said soft raw juice is concentrated to produce a soft raw syrup containing above about 65 weight percent solids, and said soft raw syrup is stored at a temperature sufficient to prevent crystallization of sucrose.

22. A process according to claim 20, wherein said chromatographic separation procedure is based upon a low cross-linked gel type chromatographic separation resin in monovalent form.

23. A process according to claim 16, further including providing means for monitoring the hardness level in said soft raw juice and discontinuing flow to said ion exchange softening procedure when said means reveals a hardness level above a set point.

24. A process according to claim 16, wherein the duration that said raw juice is subjected to said ion exchange softening procedure is determined by the calcium composition at the time of harvest of the sugar beets processed to form said raw juice.

25. A process according to claim 16, wherein said juice is subjected to said softening procedure until the hardness level in said soft raw juice is reduced to less than about 3 milliequivalents calcium per 100 grams of dry substance.

26. A process according to claim 25, wherein said raw juice is processed to reduce its suspended solids content to a level of less than about 0.05 volume percent before said raw juice is subjected to said ion exchange softening procedure.

27. A process according to claim 26, wherein said soft raw juice is concentrated to above about 50 weight percent dissolved solids to produce said soft raw syrup.

28. A process according to claim 26, wherein said soft raw juice is concentrated to between about 50 and about 70 weight percent dissolved solids to produce said soft raw syrup.

29. A process according to claim 28, wherein said chromatographic separation procedure is based upon a low cross-linked gel type chromatographic separation resin in monovalent form.

30. A process according to claim 16, wherein:

said juice is subjected to said softening procedure until the hardness level in said soft raw juice is reduced from a higher level to less than about 5 milliequivalents calcium per 100 grams of dry substance;

said soft raw juice is concentrated to produce a soft raw syrup containing above about 50 weight percent dissolved solids; and said soft raw syrup is subjected to said chromatographic separation procedure to obtain a raw syrup extract from which more than about seventy weight percent of the original nonsucrose dissolved solids constituents contained by said raw juice has been removed.

* * * * *